US008285873B2

(12) United States Patent
Scott et al.

(10) Patent No.: US 8,285,873 B2
(45) Date of Patent: Oct. 9, 2012

(54) APPLICATION NETWORK COMMUNICATION

(75) Inventors: George M. Scott, Sunnyvale, CA (US); Nikhyl P. Singhal, Cupertino, CA (US); Samir G. Mitra, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 12/560,380

(22) Filed: Sep. 15, 2009

(65) Prior Publication Data

US 2011/0047127 A1 Feb. 24, 2011

(51) Int. Cl.
*G06F 15/173* (2006.01)

(52) U.S. Cl. ........ 709/242; 709/230; 709/238; 370/355; 370/356

(58) Field of Classification Search .................. None
See application file for complete search history.

(56) References Cited

U.S. PATENT DOCUMENTS

| | | | |
|---|---|---|---|
| 5,905,873 A | 5/1999 | Hartmann et al. | |
| 6,101,528 A | 8/2000 | Butt | |
| 6,334,158 B1 | 12/2001 | Jennyc et al. | |
| 6,463,056 B1 | 10/2002 | Silva et al. | |
| 6,625,168 B1 | 9/2003 | Langer et al. | |
| 6,647,420 B2 | 11/2003 | Hellbusch et al. | |
| 6,651,117 B1 | 11/2003 | Wilson et al. | |
| 6,772,413 B2 | 8/2004 | Kuznetsov | |
| 6,810,427 B1 | 10/2004 | Cain et al. | |
| 6,889,260 B1 | 5/2005 | Hughes | |
| 6,983,449 B2 | 1/2006 | Newman | |
| 7,003,481 B2 | 2/2006 | Banka et al. | |
| 7,162,722 B1 | 1/2007 | Supinski et al. | |
| 7,191,248 B2 | 3/2007 | Chattopadhyay et al. | |
| 7,200,651 B1 * | 4/2007 | Niemi | 709/223 |
| 7,383,355 B1 | 6/2008 | Berkman et al. | |
| 7,610,404 B2 | 10/2009 | Scott et al. | |
| 7,730,182 B2 | 6/2010 | Mital et al. | |
| 7,805,532 B2 * | 9/2010 | Pattison et al. | 709/230 |
| 2002/0013827 A1 * | 1/2002 | Edstrom et al. | 709/219 |
| 2002/0059425 A1 * | 5/2002 | Belfiore et al. | 709/226 |
| 2002/0178254 A1 | 11/2002 | Brittenham et al. | |
| 2002/0194336 A1 * | 12/2002 | Kett et al. | 709/225 |
| 2002/0198734 A1 | 12/2002 | Greene et al. | |
| 2003/0040920 A1 | 2/2003 | Adams et al. | |
| 2003/0101284 A1 | 5/2003 | Cabrera et al. | |
| 2003/0233249 A1 | 12/2003 | Walsh et al. | |
| 2004/0023723 A1 | 2/2004 | Jandel et al. | |
| 2004/0073812 A1 | 4/2004 | Wesinger et al. | |
| 2004/0226459 A1 | 11/2004 | Hill et al. | |
| 2005/0246415 A1 * | 11/2005 | Belfiore et al. | 709/203 |
| 2009/0094364 A1 | 4/2009 | Stevens et al. | |
| 2011/0047293 A1 | 2/2011 | Scott et al. | |
| 2011/0047591 A1 | 2/2011 | Scott et al. | |

* cited by examiner

*Primary Examiner* — Mohamed Ibrahim
(74) *Attorney, Agent, or Firm* — Patterson & Sheridan, LLP

(57) ABSTRACT

Techniques are provided to discover and integrate applications in an application router framework. The discovery operation includes receiving a registration notification for an application on a network, adding information describing the application to a repository into a data structure and publishing the data structure onto an application router. Association operations include querying one or more application routers on an application network for meta-data and other information on applications, exchanging the meta-data and other information between the application routers and associating the applications together automatically using their respective application protocols. Routing operations include receiving application information in an application protocol format, converting the application information in the application protocol format into a neutral protocol format and forwarding the application information in the neutral protocol format along with state information to other application router devices on the network.

20 Claims, 8 Drawing Sheets

APPLICATION NETWORK COMMUNICATION

CROSS-REFERENCE TO RELATED APPLICATIONS

This application relates to and claims priority to U.S. application Ser. No. 10/444,635, filed May 22, 2003 and titled "Application Network Communication Method and Apparatus", which is incorporated herein by reference in the entirety for all purposes.

BACKGROUND OF THE INVENTION

Many companies leverage computer systems and software applications to improve their efficiency and organization in business. Often these systems are integrated together allowing information from one software application or system to be used or analyzed by another software application or system. Benefits associated with integrating and using these computer systems and software in business are numerous and include tighter control over inventory, improved financial forecasting, streamlined information-flow internally and externally and sales force automation.

The various benefits of leveraging computer technology generally justifies the hiring of large information technology (IT) staff to keep these computer systems operational and communicating with each other. Often, these IT departments are saddled with the task of integrating many disparate computer systems and software applications in attempt to make corporate information flow more freely and securely.

Unfortunately, the complexity of integrating these large computer systems and software applications in a company has made systems integration a daunting and expensive task. Systems integration projects have become increasingly complicated requiring specialized knowledge of applications, protocols, communications, hardware and other areas that the IT staff at a given company may not possess. Even with the proper knowledge and training, most IT departments are too small to complete large scale systems integration projects in a reasonable time frame.

Consequently, a large number of system integration projects require customized development completed using consultants or outsourced to system integrators that specialize in integrating these large scale systems. The solutions involve integrating the data and business logic between several existing applications and frequently involve complex solutions. Because the work is outsourced and/or complex, these customized solutions can also be very expensive. Maintaining software as the companies grow and their needs change may also cost a great deal of money as the same consultants may be needed after the initial systems integration effort is put in place.

In attempt to reduce costs and expedite the integration, many companies are exploring system integration tools/methodologies as an alternative to customized software development. These solutions include enterprise application integration (EAI) solutions and application server technologies. The EAI solution provides a solution to some of the system integration problems but requires a company to commit to a proprietary platform. Application server solutions are also useful but also involve proprietary protocols. Scalability is also a problem with these methodologies as companies grow and demand more processing power and throughput from their systems.

SUMMARY OF THE INVENTION

One aspect of the present invention includes a method of discovering applications on a network for integration. The discovery includes receiving a registration notification for an application on a network having information on the application, adding the information describing the application to a repository used to reference the application, organizing the repository information into a data structure accessible through a user-interface and publishing the data structure onto an application router.

Another aspect of the present invention includes a method of associating applications together to facilitate the exchange of application information. The association includes querying one or more application routers on an application network for meta-data and other information on applications in the corresponding application router repositories, exchanging the meta-data and other information on the applications between the application routers and associating two or more applications together automatically using a communication path wherein each of the two or more applications individually can communicate over the application communication path using their respective application protocols.

A further aspect of the present invention includes A method of routing application information. The routing includes receiving application information in an application protocol format over a network, converting the application information in the application protocol format into a neutral protocol format compatible with one or more application router devices on the network and forwarding the application information in the neutral protocol format along with state information describing the status of processing the application information to one or more application router devices on the network.

Yet another aspect of the invention includes a system for integrating the processing of applications. This system includes an application network having at least one application router capable of communicating information about one or more applications with other application routers in a neutral protocol format and an application associated with the at least one application router that communicates in a proprietary application protocol and is converted by the at least one application router into the neutral protocol format.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Aspects of the present invention provide one or more of the following advantages. Applications in an enterprise can be integrated with multiple other applications with significantly reduced development requirements. Instead of a proprietary protocol, application routers convert proprietary application protocols into a neutral protocol format that the application routers can readily exchange with each other. Modeling application communication in the application network in the neutral protocol format enables a user to view the application data as though it were from a single application distributed over the network. From each application's point of view, it appears that communication is still in the proprietary application format as the application router converts the neutral protocol format back into the proprietary application format to communicate back with each application. This reduces costs to manage and implement as information technology departments can develop skills in using the neutral protocol format instead of requiring individuals with specialized skills for each different integration platform.

Implementations of the present invention enable rapidly growing networks to be scaled to meet demand rather than costly and complex reengineering efforts. Additional, application routers and application router software are added to the network as the demand for applications across the enterprise increases. The newly added and existing application routers communicate with each other to share the added load and meet increasing needs within the application network. This avoids bottleneck situations brought on when a single point of integration becomes overloaded with application transaction requests or experiences a system failure.

Sophisticated application data management and security enforcement is also possible using the present invention. By distributing application processing over multiple nodes, ancillary but necessary processing of application transactions can be monitored and reported without impacting overall performance. Added processing bandwidth makes it possible for stringent user security policies in the enterprise to be carried out in an application-to-application communication framework. Applications can be authenticated and authorized both statically in advance and dynamically as applications exchange sensitive and/or confidential information.

Simplified management is also possible as applications in an enterprise are monitored through a single point-of-entry. Information flowing through an application router and accompanying software can be tapped for information even in large distributed installations. A designated application router can be configured as a collection point and set up to monitor the application network gathering statistics and logging information in real-time as it is generated from multiple different points in a network.

Figure 1:
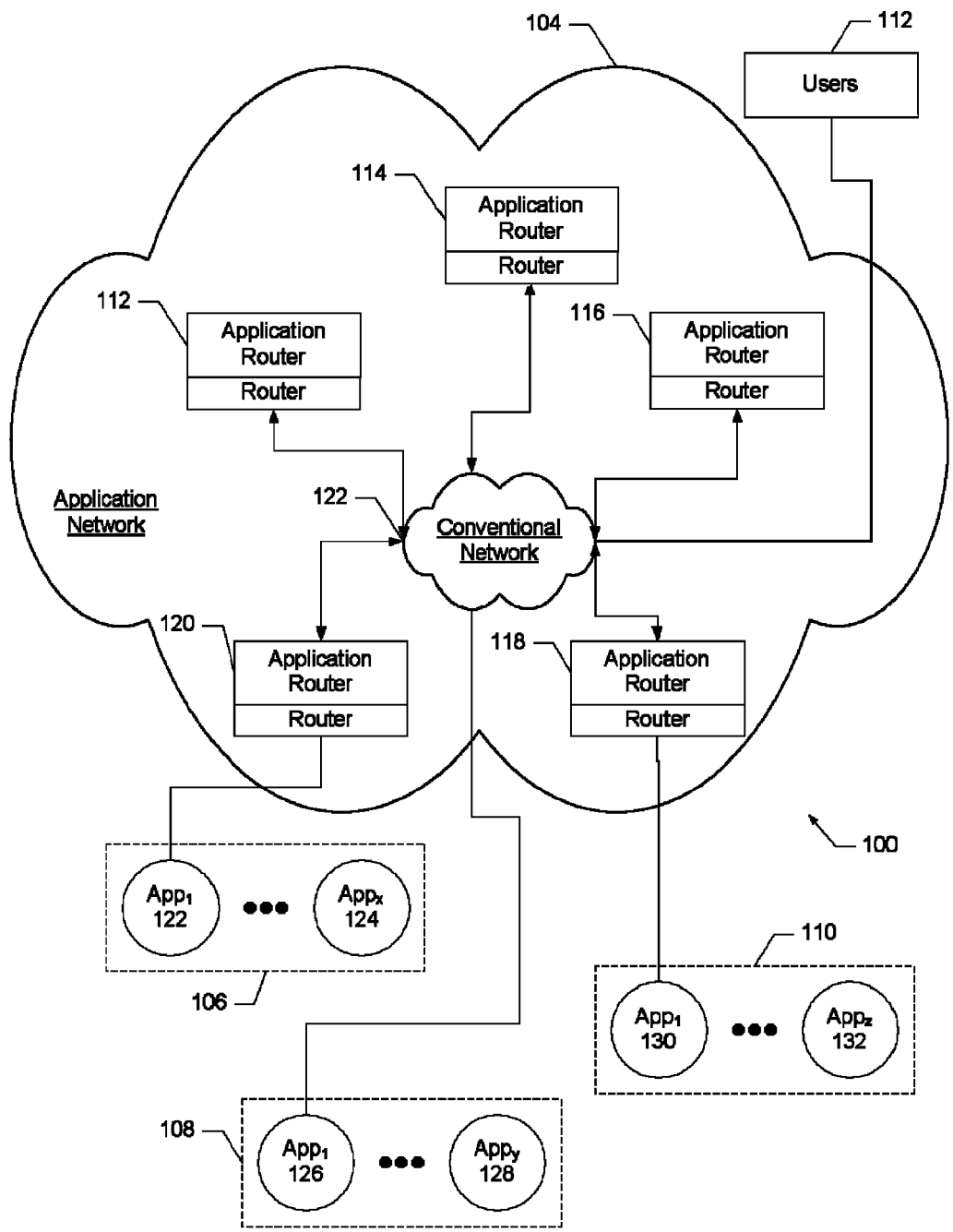
FIG. 1 is a block diagram illustrating a system using application routers in an application network in accordance with one implementation of the present invention.

FIG. 1 is a block diagram illustrating a system 100 using application routers in an application network 104 in accordance with one implementation of the present invention. System 100 includes application router network 104, application set 106, application set 108, application set 110 and users 112 accessing these various application sets over application router network 104. Each application set includes a number of different applications grouped together based on common traits, shared data/information or other types of relationships to each other. Specifically, application set 106 includes applications $app_1$ 122 through $app_x$ 124, application set 108 includes applications $app_1$ through $app_y$ 128 and application set 110 includes applications $app_1$ 130 through $app_z$ 132. For example, application set 106 may include all the enterprise applications used for a manufacturing division of a company while application set 108 includes enterprise applications used in the sales and marketing division of a company. For the same company, application set 110 may further include corporate enterprise applications concerning financial management, human resources, corporate tax and accounting, research and other corporate-wide functions. These application sets 106, 108 and 110 can be physically located in a single location or distributed internationally. Alternatively, each application set 106, 108 and 110 may correspond to all the enterprise applications within different subdivisions. In this case, each application set 106, 108 and 110 may include enterprise applications for manufacturing, sales, marketing and corporate operations previously described and performed at different corresponding divisions in a company.

In either implementation above or in other configurations, it is often necessary for applications in one or more application sets to communicate across application network 104 in accordance with implementations of the present invention to other applications in other application sets. Typically, enterprise applications need to share critical information about a company or business as well as integrate different workflow requirements. For example, a manufacturing or shipping application providing just-in-time services may need to receive information gathered from purchase orders in a sales force automation application. Workflow in the manufacturing application may require payment to be made in advance before starting manufacturing and also may need to coordinate the manufacturing with another materials procurement or inventory management application located elsewhere in an enterprise. At each junction, applications need to accurately and efficiently share information and ensure certain steps are performed according to specific workflow requirements needed in each area. This complex process of exchanging data and coordinating workflow requirements is facilitated and automated in accordance with the present invention.

Application network 104 also provides secure communications capabilities between the applications in application sets 106, 108 and 110 and users 112 operating these various applications. In this example implementation, application network 104 includes application router 112, application router 114, application router 116, application router 118 and application router 120 configured to transmit application data to each other over conventional network 122 using secure methods involving encryption, authentication and authorization of users and applications. Application level security features implemented within application routers allows access or denies access based on detailed transactional and/or application information and not simply storage partitions, file distinctions or other logical storage boundaries.

For example, a first application may be granted access to data from a second application if the data associated with the second application was previously or originally created by the first application. Of course, the first application can be granted various levels or read and/or write permissions by the second application explicitly after data in an application has been created. Application level security granularity allows application data to be securely administered based on transactions or records even if the data is under the same enterprise applications. Alternatively, if lower security is required then application routers can be configured to share all data between different applications associated with one or more application routers.

Once security is determined and processed, application data travels over conventional network 122 carried by TCP/IP, SNA, Novell Netware or any other similar network protocol capable of providing access to a layered network communication model or any other equivalent general purpose networking protocol. In practice, conventional network 122 also includes conventional routers, switches, repeaters and other networking devices familiar to those skilled in the art and used for general purpose broadband or local area networking.

Application routers 112, 114, 116, 118 and 120 include conventional routing technology along with application routing functionality in accordance with the present invention. Application routing operations receive application data, convert the application data into a neutral format and then route the data to the appropriate application through one or more application routers in application network 104. Further, application routers convert the neutral format data back into the proprietary application protocol when communicating data back to an application.

Figure 2A:
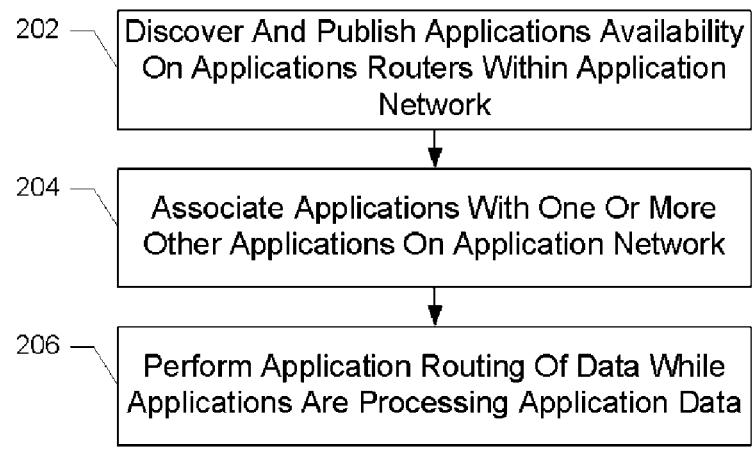
FIG. 2A is a flowchart diagram of the operations performed to integrate applications together using application routers and software in accordance with implementations of the present invention.

FIG. 2A is a flowchart diagram of the operations performed to integrate applications together using application routers and software in accordance with implementations of the present invention. Applications initially perform discovery of other applications by publishing the application availability on the application routers within the application network (202). Applications publish application information sufficient to identify data structures used by an application to carry information, interfaces describing access methods to these data structures and protocols for transmitting/receiving information over a network. Additional information published may include a public-key, encrypted password or other security information to ensure the transaction is performed securely and confidentially. Further information on discovery is described in further detail later herein.

Published information facilitates in associating one application in the application network with one or more other applications on the application network (204). Application routers exchange meta-data and other information about different applications and then automatically associate different applications together. This association process maps data fields from the data structures used in a first application with corresponding data fields from the data structures of a second application. In some cases, bytes orders may be swapped or filled to accommodate low-level format differences that exist between data in the various data structures. Implementations of the present invention perform application routing once the applications are associated with each other in accordance with the present invention (206).

Figure 2B:
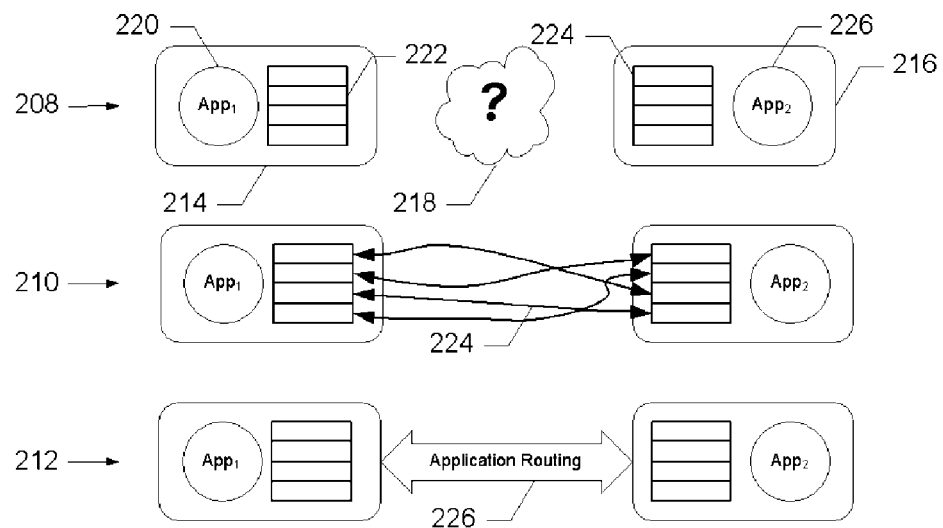
FIG. 2B is a pictorial depiction of the operations for integrating applications into the application network in accordance with implementations of the present invention.

FIG. 2B is a pictorial depiction of these operations for integrating applications into the application network in accordance with the present invention. Applications are integrated through discovery 208, association 210 and then application routing 212. Prior to integration, $app_1$ 214 and $app_2$ 216 are placed within an application network 218 in accordance with the present invention but cannot exchange application data. During discovery 208, $app_1$ 214 and $app_2$ 216 publish their availability on the application network. Logic 220 and application 222 from $app_1$ 214 and logic 226 along with application data 224 from $app_2$ 216 are registered and made available on the application network 218. Implementations of the present invention automatically perform association 210 between $app_1$ 214 and $app_2$ 216 based upon the meta-data thereby connecting application data 222 with application data 224 according to their respective logic 220 and logic 226. Once these steps are complete, routing 212 performs application routing 226 in accordance with the present invention allowing applications to rapidly exchange their respective pools of information.

Figure 3:
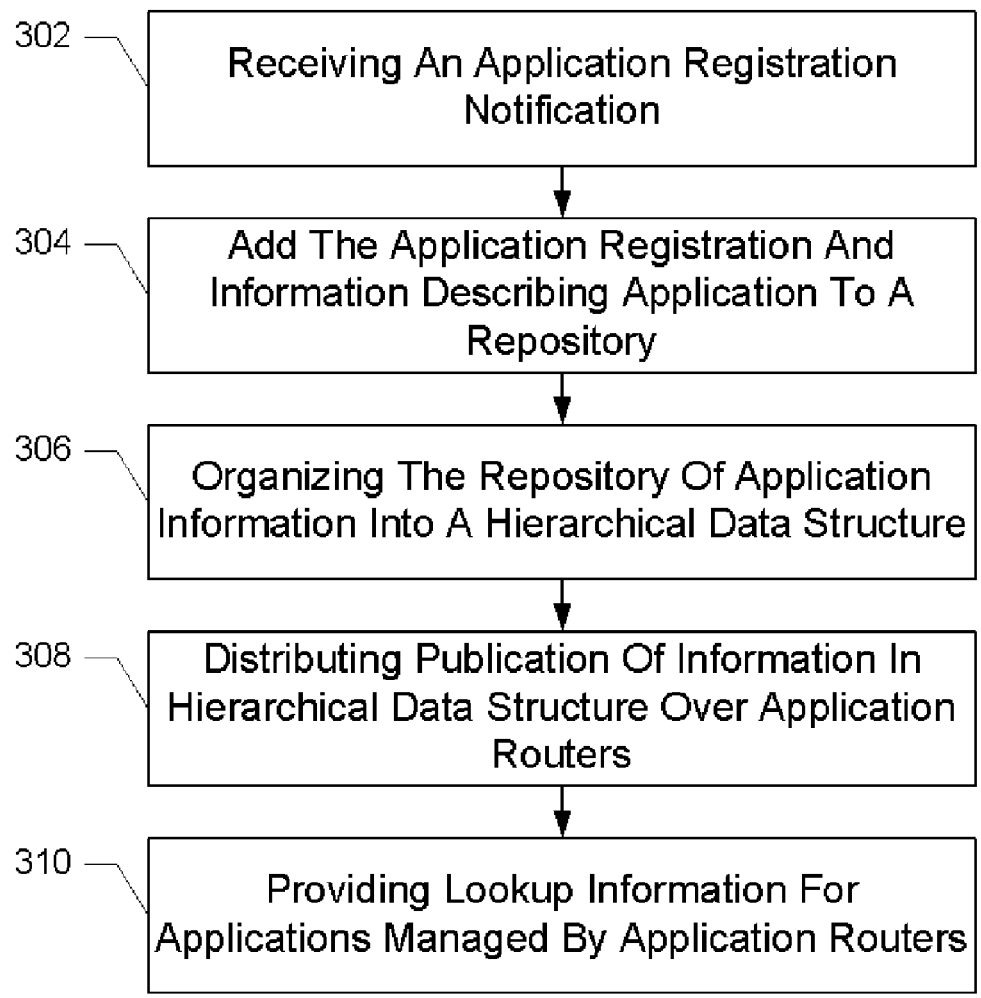
FIG. 3 includes further details operations for registering applications in the application network in accordance with one implementation of the present invention.

FIG. 3 includes further detailed operations for registering applications in the application network in accordance with one implementation of the present invention. Initially, an application router receives an application registration notification from an application (302). In one implementation, an application router broadcasts information about the application network inviting application on the network to register on the application network. Applications respond by sending a registration notification to join the application network. For example, an application could send a registration packet to the application router with basic information about the application. Alternatively, each application entering the application network broadcasts or multicasts over a well-known communication port the availability of the application on the application network in the form of a registration packet. The application router listening over the communication port for the broadcast or multicast of the registration packet intercepts and begins processing the registration. In yet another alternative, the application router identifies nodes on the conventional network and probes each node sequentially for applications to be registered in the application network. In this implementation, the application router sequences through each network node on the network and identifies one or more applications on each node. If an application is located on a node, the application router then transmits an invitation to submit the application registration notification over a well-known communication port. Applications listening over the communication port receive the invitation and in response transmit the application registration to the request within a time-out period or the application router moves on to the next application or node on the network.

The application router that receives the application registration packet adds the information describing the application to a repository (304). The repository is a data storage area kept on the application router that stores the application information obtained through the registration packet. In one implementation, a first copy of the repository is kept on an active application router and a standby application router maintains a complete duplicate or backup copy of the repository. If the active application router goes down or becomes unavailable, the standby application router automatically takes over application routing operations.

Alternatively, portions of the repository may reside on different application routers if specific application routers are designated to process certain applications. For example, one application router can be configured to process all "payroll" from payroll software while another application router can be responsible for processing "purchase orders" from a purchase order application. If the application router handling "payroll" applications receives registration packet to register a "purchase order" application, the registration packet is forwarded to the correct application router handling "purchase order"

type applications. This approach provides reliability by distributing the repository information to different application routers depending on the application router's responsibilities. Applications can alternatively be associated with certain application routers based on the relative distance or "hops" between the application router and the system or node upon which the application is loaded.

In one implementation, the application router organizes the repository information containing the application information into a hierarchical data structure (306). This hierarchical data structure is easy to manipulate and can be organized to improve search times for application data. Portions of the hierarchical data structures can be distributed over more than one application router to increase availability and scalability as the application network grows. Information of the hierarchical structure for storing application information is described in further detail later herein.

Once the application and registration information is entered, the application router(s) publish and distribute the information in a hierarchical data structure (308). In one implementation, each application router contains a complete static copy of the hierarchical data structure having application information. Alternate implementations of the present invention publish portions of the hierarchical data information on different application routers throughout the application network according to a distribution scheme. For example, one distribution scheme could identify the computer system running an application and then load the hierarchical data information concerning the application onto the corresponding application router nearest to the computer system.

Hierarchical data information is then provided as lookup information for applications managed by application routers (310). In one implementation, application routers query one application router in the application network for the hierarchical data information about the various applications. A standby application router is used to provide the application information in the even the first or active application router experiences a failure or error.

Figure 4:
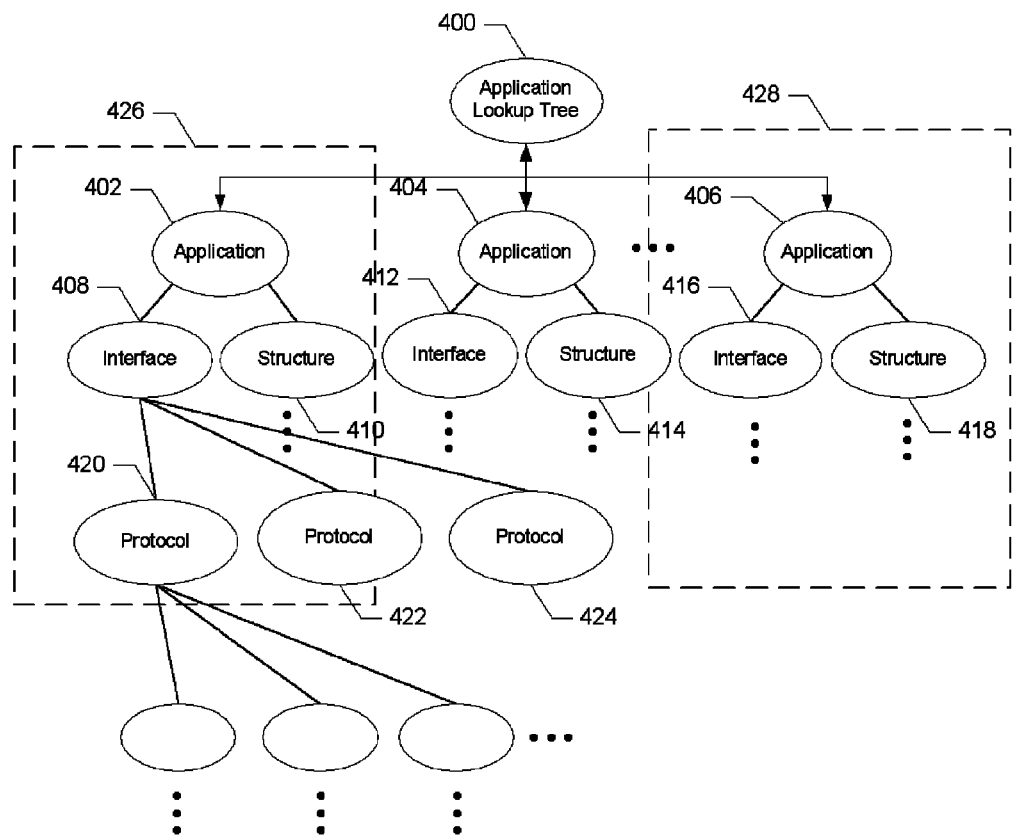
FIG. 4 is a block diagram depiction of one hierarchical data storage used by application routers in accordance with implementations of the present invention.

FIG. 4 is a block diagram depiction of one hierarchical data storage used by application routers in accordance with implementations of the present invention. In this example, an application lookup tree 400 includes an application 402, an application 404 and an application 406 corresponding to the first, second and Nth application in the application network. Each of these entries can be used to describe general information about an application including an application name, a business category associated with the application (i.e., CRM —customer relations management) and meta-data used when publishing information about the application.

Associated with each application are interfaces 408, 412 and 416 that facilitate communication with the corresponding applications 402, 404 and 406. These interfaces include meta-data and other information to describe communication used with various application services, component technologies, object-oriented interfaces and, if appropriate, system calls for the associated target application. The interface definitions can be used by an application router to access more meta-data information as needed in a meta-data repository and perform on-the-fly conversions to a target application protocol. Accordingly, additional meta-data information included in protocol 420, protocol 422 and protocol 424 definitions help improve communication to the different target applications over the interface.

Application lookup tree 400 also identifies a first data portion 426 and a second data portion 428 to illustrate approximate areas for dividing application lookup tree 400. In one implementation, first data portion 426 contains information pertaining to application 402 including interface, structure, protocols and meta-data. Similarly, second data portion 428 has information on application 406 and also includes other information and meta-data. In accordance with implementations of the present invention, first data portion 426 and second data portion 428 corresponds to divisions in the hierarchical data storage capable of being distributed over the application network to reside on specific application routers. As previously described, portions of the hierarchical data storage can be distributed according to different schemes including locating an application router nearest in the network to the computer node or system where the actual application actually resides.

Figure 5:
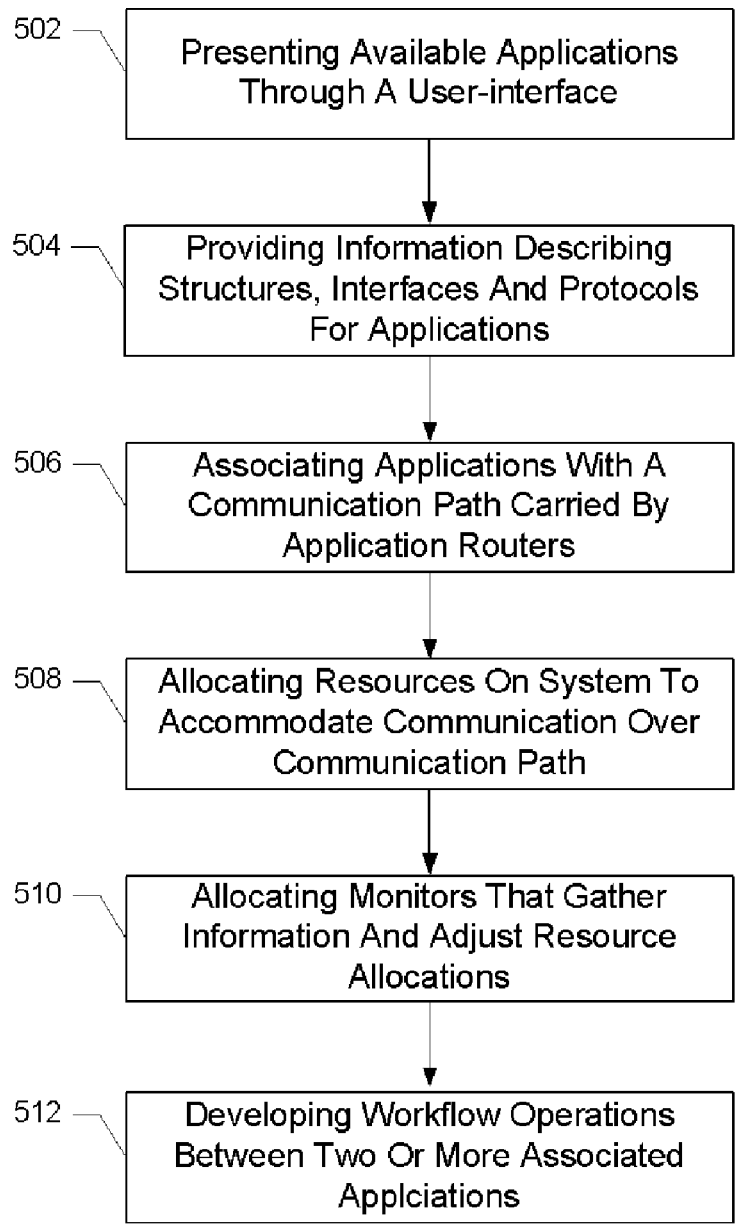
FIG. 5 is a flowchart diagram of the operations used to associate applications together on the application network in accordance with one implementation of the present invention.

FIG. 5 is a flowchart diagram of the operations used to associate one application with another application in the application network in accordance with one implementation of the present invention. An application router in the application router network provides a user-interface to associate applications and perform many other application router configuration operations (502). The user-interface can be delivered as a traditional GUI (graphical user interface) running as a separate program on a computer or can be delivered by an embedded web-server in the application router as an HTML or XML page and viewed in a web-browser application such as Internet Explorer, Netscape Navigator or Opera browser.

Association between applications occurs automatically in accordance with implementations of the present invention. Application routers exchange meta-data with each other providing information describing the structures, interfaces, and protocols used by the different applications registered on the application network (504). In one implementation, application routers query other application routers on the application network for meta-data and other information in the corresponding application router repositories. In one implementation, an application router may use an application router exchange protocol such as ARIP to query the other application routers. ARIP is a protocol used for application router-to-application router communication. Once one or more applications are identified, the application routers exchange the meta-data and other information on the applications known to the application routers. For example, a security application may be automatically associated with a human resources application to obtain fingerprints, password information or other personal details to authenticate and then authorize access to a person.

In addition, application routers also automatically associate applications with a communication path carried by the application routers. (506). For example, the application routers determine the communication bandwidth needed and then allocate the bandwidth from a pool of available bandwidth within the application network.

In an alternate implementation, the GUI allows a user to configure some or all of this information manually as needed. The user driven association operation can also include associating applications with a communication path carried between one or more application routers.

Implementations of the present invention identify the necessary resources to provide uni-directional or one-way communication as well as bi-directional or two-way communication between pairs of application routers. Resources identified include a communication bandwidth between two or more application routers, processor cycles on the application routers required to process the data and potentially storage. Once determined, these resources are provisioned or allocated from one or more application routers on the application network (508). This can reserve actual bandwidth or processor cycles for the specific application router or can simply make a portion of application router bandwidth, storage and processor cycles unavailable for subsequent use.

Monitors are set in place to gather information and adjust the resource allocations or provisions as needed (510). These monitors gather information on the communication bandwidth utilization when two or more applications are communicating to better match the bandwidth provisions with the bandwidth requirements as they change. Generally, the monitors can be implemented in software, hardware or a combination of the two and embedded in the application router.

Another operation in the association includes developing workflow operations between two or more associated applications (512). Workflow describes the direction of information traveling through one application and then out through another application. Often, workflow requires properly sequencing the occurrence of events on one application with the occurrence of events on another related but different application. For example, workflow may require that a purchase order received through a sales or marketing application is first successfully processed through a security and/or credit check before being accepted as a valid purchase order. The workflow may also specify a method of getting cash in advance if the purchaser has poor credit or otherwise does not qualify for a business line-of-credit.

Workflow can also describe operations for establishing security over the communication path and ensuring communication is secure. For example, establishing a secure communication path may include performing deep packet inspection and determining if secured or unsecured information is being exchanged over the communication path. To perform deep packet inspection for this purpose, there may also be a set of rules to compare one or more aspects of the application information to determine if secure information is actually being exchanged. Rules can further be used to determine authentication and authorization of the user and the application.

Figure 6A:
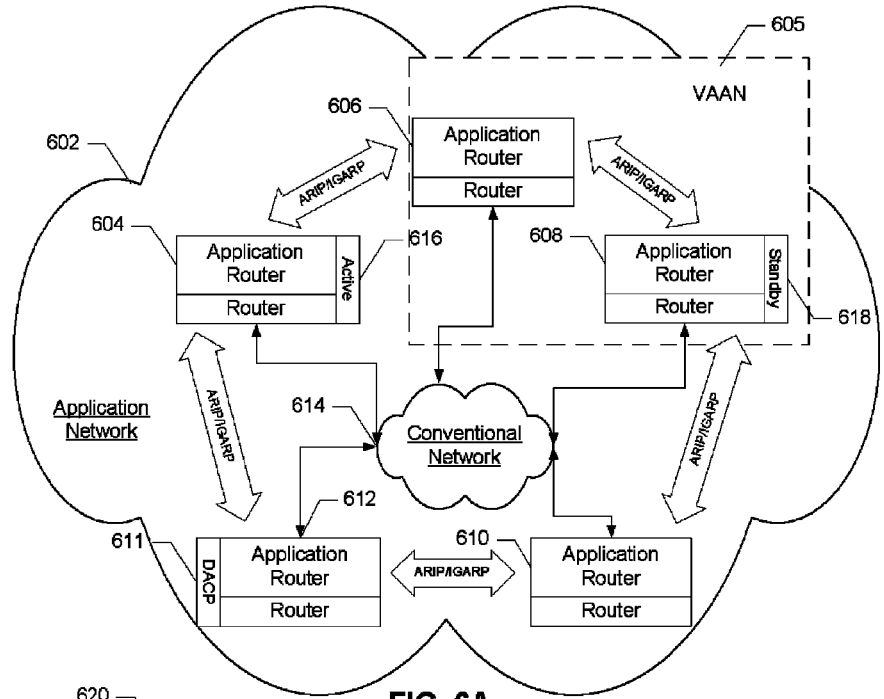
FIG. 6A is a block diagram of an application network implemented in accordance with one implementation of the present invention.

FIG. 6A is a block diagram of an application network implemented in accordance with one implementation of the present invention. The application network 602 in this diagram emphasizes some of the application network protocols and capabilities. Accordingly, application network 602 includes an application router 604, an application router 606, an application router 608, an application router 610, and an application router 612 that communicates over conventional network 614. Each application router contains features of conventional router in addition to the special operations of the application router designed in accordance with the present invention.

Between application routers, an application router interface protocol or ARIP operates to convert between an application identifier and conventional networking addresses. The ARIP protocol exchanges application identifiers for each application and the corresponding networking address information as needed by different applications in the application network. In addition, the ARIP protocol allows application router to exchange meta-data and other information about various applications and facilitate automatic association of the applications. For example, a sales management application can automatically locate a inventory management application registered on a different application router through the ARIP protocol. Implementations of the present invention would automatically associate these application together provided the meta-data exchanged by the application routers is sufficient.

For fault tolerance and improved performance, application router 604 has a designation as being active 616 while application router 608 is considered standby 618. In the event application router 604 fails temporarily or permanently, the status and role of application router 608 is changed to active 616 from standby 618. Once application router 604 is working properly, application router 604 status can be changed back to active 616 and application router 608 changed back to standby 618.

A virtual application area network (VAAN) 605 is also part of the network to provide application to application security on application network 602. In this example implementation, application information in the neutral protocol is limited to application router 606 and application router 608 in VAAN 605; communication between application routers in VAAN 605 is secure and not detected by other application routers outside VAAN 605. This feature allows different businesses or divisions of a company to share an overall application network yet keep certain application communications separate and secure. This also allows portions of the application network to extend to telecommuters that may perform a portion of the communication from a public switched telephone network (PSTN) using DSL or other broadband communications yet need to maintain a secure communication environment.

In addition, one or more application routers can provide a dynamic application communication protocol (DACP) for allocating application identifiers to applications entering the application network. In this example, application router 612 includes a DACP 611 service that dynamically allocates and deallocates an application identifier to applications entering the application network. In one implementation, the application identifier is leased to an application for a lease period whereupon expiration of the lease the application requests a lease renewal from DACP 611 or is not allowed back onto the application network. This application identifier is used to uniquely identify applications to each other on the application network for subsequent communication and data sharing once they are properly authenticated and authorized.

Figure 6B:
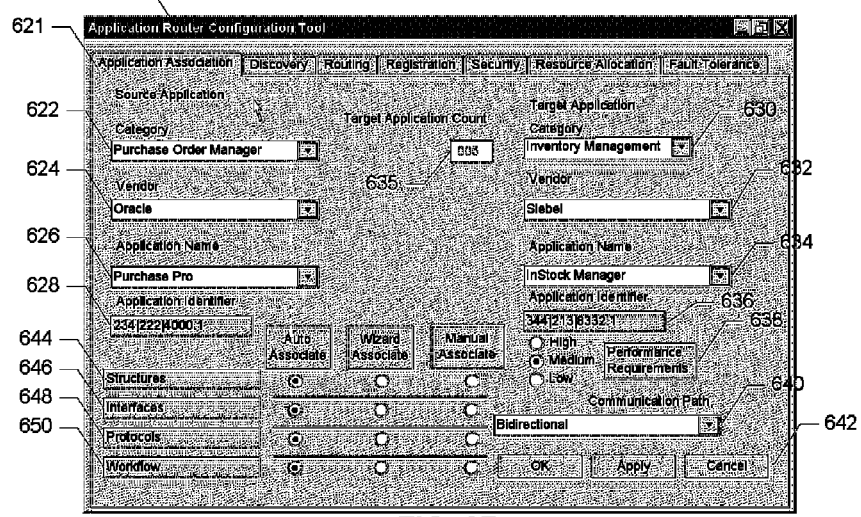
FIG. 6B is an example user-interface used for configuring the application router in accordance with one implementation of the present invention.

FIG. 6B is an example user-interface used for configuring the application router in accordance with one implementation of the present invention. The user-interface in this example displays a series of tabs corresponding to different areas for configuring the application router. The configuration areas for the application router include application association, discovery, routing, registration, security, resource allocation and fault tolerance settings. Each configuration area receives a number of settings and transmits the settings to one or more application routers in accordance with the present invention.

In particular, application association configuration area 621 depicts a few of the settings used to associate one or more applications with each other. Application association configuration area 621 presents a source application category 622, a source application vendor 624, a source application name 626, a source application identifier 628, a target application category 630, a target application vendor 632, a target application name 634, a target application identifier 636 and a target application count 635 indicating the number of different target applications currently associated with source application identifier 628. As this depicts only one implementation, alternate implementations may contain fewer or greater options to configure the association between applications as well as different options other than those identified and displayed in FIG. 6B. Further, the configuration options depicted can be arranged in a different juxtaposition to each other as well as be distributed on one or more different configuration areas of the GUI.

In operation, application association occurs automatically using implementations of the present invention. Generally, application routers exchange meta-data concerning different registered applications and associate the structures, interfaces and protocols of the different applications. As an alternative implementation, configuration area 621 enables a user to add, edit or view associations between applications. While these associations are generally created automatically, there may arise the need to manually configure the application router in accordance with implementations of the present invention. If selecting source application category 622, source application vendor 624 and source application name 626 results in source application identifier 628 then the application is already in the application network. Similarly, selecting target application category 630, target application vendor 632 and target application name 634 produces target application identifier 636 the target application is also registered in the application network and is probably also already associated with source application identifier 628.

Additional settings on application association configuration area 621 are used to establish or modify an association between a source application and target application in the application network. In one implementation, these additional settings include a structures setting 644, a interfaces setting 646, a protocols setting 648, a workflow setting 650, a performance setting 638, a communication path setting 640 and control settings 642 to effectuate the entered settings.

Each of structures setting 644, interfaces setting 646, protocols setting 648 and workflow setting 650 can be set automatically using an "Auto Associate" option, semi-automatically using guidance from a "Wizard Associate" option or manually using a "Manual Associate" option. By default, associations are automatically generated in accordance with implementations of the present invention.

"Auto Associate" option analyzes the data and meta-data concerning the selected item and performs an association according to a set of rules or expert-systems. The "Wizard Associate" presents a user or operator with a number of different options to associate the applications and allows the user or operator to make the selections. Finally, a "Manual Associate" option allows a user or operator to manually perform the association between the various one or more applications in the application network.

Performance setting 638 allows a user to specify a relative performance requirement desired for communication between the applications. Higher performance provides communication over higher speed connections and shorter paths between applications on the application network when possible while lower performance requirements can be accommodated with a larger variety of connections in the application network.

In addition to performance needs, it is sometimes desirable to control the flow of data between applications. Bidirectional communication (displayed in FIG. 6B) in communication path 640 is one type of communication applications use to transmit information back and forth to each other over a single communication path or multiple communication paths on the application network. To limit the flow of information further, a "Source-to-Target" setting limits the flow of information from the source application to the target application while a "Target-to-Source" setting limits the flow of information from the target application to the source application over one or more communication paths. For example, a "Target-to-Source" setting in Communication Path 640 could be used if it is desired for a sales application placing orders (i.e., a source application) to send orders to an inventory management application (i.e., a target application) without a return receipt or return communications.

Figure 7:
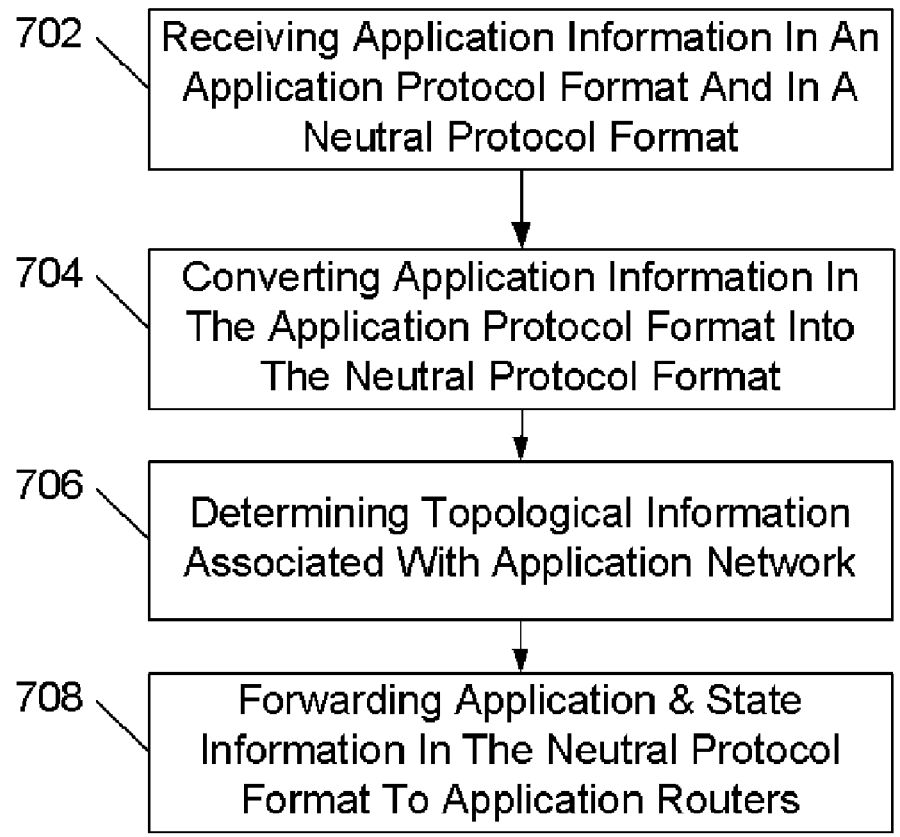
FIG. 7 is a flowchart diagram of the operations associated with routing application information between applications in accordance with one implementation of the present invention.

FIG. 7 is a flowchart diagram of the operations associated with routing application information between applications in accordance with one implementation of the present invention. Applications are registered and associated with each other as previously described before application routing can be performed. In the application network, application routers receive application information in an application protocol format and a neutral protocol format (702). These application protocol formats include SOAP, XML/HTTP, IIOP, RMI, SQL, EDI and SNMP. Neutral protocol formats can be exchanged between application routers without further conversions. Conversely, proprietary application protocol formats coming into the application router need to be converted into a neutral protocol format before further processing (704). In one implementation, meta-data relating to the application structures, interfaces, and protocols are used to assist in converting these various protocols into a neutral protocol format compatible with XML (extensible markup language). To perform the conversion, an application router references the meta-data to identify application information in the application protocol format and convert it to the neutral protocol format. For example, this information facilitates a mapping of the application information to one or more structures in the neutral protocol format of XML.

Application routers also determine topological information associated with the application network before routing application information (706). The application routers use topological information to transmit application information to one or more different application router to meet service level agreements (SLA) or other performance requirements while minimizing utilized resources. This satisfies customer requirements for application routing while minimizing system utilization requirements.

In addition, application routers communicate state information along with application data when communicating to different application routers in the application network. This makes the transfer and processing of application data between various applications in the application network possible without losing track of information and status of the processing. Stateful processing of application data allows several applications to process data and send reporting status at each stage. If an application router cannot continue processing, status is transmitted indicating the point of failure and an error code. Similarly, application routers can also send back information indicating successful processing of application data.

Accordingly, application routers forward state information and application information in the neutral protocol format to one or more application routers (708). Workflow information is included in application information and state information to facilitate proper routing of application data throughout the application network. For example, one implementation of the present invention includes this state information and application data in one or more objects. The state information and workflow information also indicate when the processing of certain application information has been completed.

Figure 8:
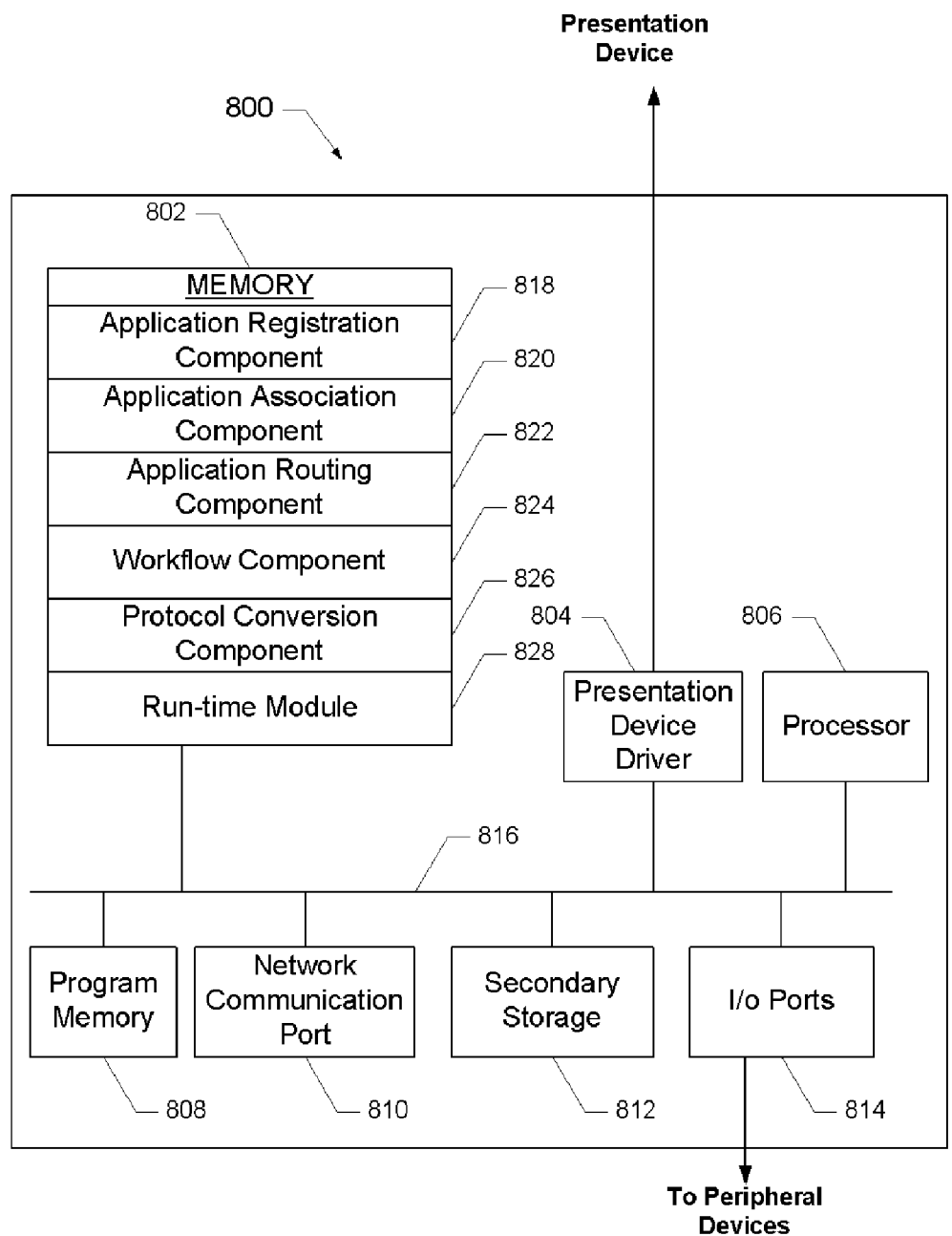
FIG. 8 is a block diagram of a system used in one implementation for performing the apparatus or methods of the present invention.

FIG. 8 is a block diagram of a system 800 used in one implementation for performing the apparatus or methods of the present invention. System 800 includes a memory 802 to hold executing programs (typically random access memory (RAM) or writable read-only memory (ROM) such as a flash ROM), a presentation device driver 804 capable of interfacing and driving a display or output device, a program memory 808 for holding drivers or other frequently used programs, a network communication port 810 for data communication, a secondary storage 812 with secondary storage controller, and input/output (I/O) ports 814 also with I/O controller operatively coupled together over a bus 816. In addition to implementing the present invention using a conventional personal computer or server, system 800 can be preprogrammed, in ROM, for example, using field-programmable gate array (FPGA) technology or it can be programmed (and reprogrammed) by loading a program from another source (for example, from a floppy disk, a CD-ROM, or another computer). Also, system 800 can be implemented using customized application specific integrated circuits (ASICs).

In one implementation, memory 802 includes an application registration component 818, an application association component 820, an application routing component 822, a workflow component 824, a protocol conversion component 826 and a run-time module 828 that manages system resources used when processing one or more of the above components on system 800.

Application registration component 818 facilitates processing of applications entering the application network. In one implementation, application registration component 818 receives broadcasts or multicasts from applications announcing their availability on the application network and registers them into the application network. For example, an application entering the application network is assigned a unique application identifier and the information associated with the application is entered into a hierarchical database storing application information. By multicasting this information, more than one application router can register the application into the application network. Alternatively, a less efficient method uses application registration component 818 to probe each application router or node associated with the application network and registers applications it discovers during this process.

Application association component 820 is used to associate one or more aspects of different applications with each other on the application network. This association can be done automatically using meta-data describing structures, interfaces, protocols and/or workflows used in the different applications. In one implementation, a application router exchange protocol (i.e., ARIP) is used by the application routers to exchange meta-data and information about different applications on the network to facilitate the association process. Alternatively, wizards can be used in conjunction with application association component 820 to connect the different applications together or this process can be performed manually by a user for those applications that do not have the proper meta-data or other information available.

Application routing component 822 routes state and application data to one or more application routers in the application network. To provide a robust operating environment, application routing component 822 converses with other application routers using various protocols including ARIP/IGARP (interior gateway application routing protocol) as well as supporting DACP (dynamic application computing protocol) to automatically allocate application identifiers to various applications. Further application routing component 822 supports high-availability and fault tolerance by implementing active application routing and standby application routing technologies.

Workflow component 824 is central to developing an efficient and accurate workflow process for application data being processed by one or more applications on the application network. Information driving workflow component 824 is partially driven by meta-data supplied with each application. Alternatively, the user or operator of system 800 can also provide workflow information to this component. In some cases, scripting or macro languages can be employed to automate the workflow operations that take place between the various applications.

Protocol conversion component 826 primarily is used to convert proprietary application formats into a neutral application format that the application routers can exchange within the application network. Initially, an application uses protocol conversion component 826 to convert the application into the neutral format like XML to allow the application routers to transmit the application information over the network. Subsequently, the protocol conversion component 826 can be used to convert the neutral protocol back into the proprietary application format as needed in the specific application. From the application standpoint, application communication continues in the application's proprietary application protocol format. In contrast, the user views application data passing through the application network in a neutral application protocol that appears to be part of a single well-integrated application.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A computer-implemented method comprising:
by a first application router on a network, discovering an application for integration on the network, wherein the application is of a first application type and communicates according to a first application protocol, wherein discovering the application comprises:
sending, on the first network, an invitation for applications of the first application type on the network to register with the first application router;
receiving a registration notification responsive to the invitation, wherein the registration notification specifies information describing the application, wherein the information includes the first application protocol;
adding the information describing the application to a repository of the first application router;
organizing the repository information into a data structure accessible through an interface; and
publishing the data structure onto at least a second application router on the network;
wherein the first application router is configured to integrate the discovered application with a target application on the network, wherein the target application is configured to communicate according to a second application protocol different from the first application protocol.

2. The method of claim 1 wherein the information on the application includes structures, interfaces and protocols used by the application.

3. The method of claim 1 wherein the information added to the repository includes meta-data describing aspects of the application.

4. The method of claim 1 wherein the data structure is organized in a hierarchical arrangement with each application having a node with corresponding information.

5. The method claim 1 wherein publishing the data structure involves distributing the publication of information to one or more application routers.

6. The method of claim 1 wherein at least one of the one or more application routers is capable of operating as a standby application router in the event one or more application routers becomes temporarily or permanently unavailable.

7. The method of claim 1 wherein the applications can be categorized into at least one category selected from a set of categories including: web services, CORBRA Objects, Database Systems, File/Document Based Interfaces and Packaged Applications.

8. The method of claim 1 wherein the at least one or more application routers broadcast invitations over the application network inviting applications to submit a registration notification and join the application network.

9. The method of claim 1 wherein each application broadcasts a registration notification over the application network notifying at least one of the one or more application routers of their availability to join the application network.

10. The method of claim 1 wherein at least one or more application routers probe a set of nodes on a conventional network inviting applications found on each node to join the application network.

11. The method of claim 1 wherein the first and second application protocols comprise proprietary application protocols, and wherein integrating the discovered application with the target application comprises associating the discovered application and the target application by:
establishing a communication path between the discovered application and the target application, to allow the discovered application and the target application to communicate with one another via the communication path using their respective application protocols; and
routing data between the discovered application and the target application, comprising:
receiving, from the discovered application, a message in a format associated with the first application protocol, the message containing the data;
converting the message into a format associated with a neutral protocol; and
forwarding the converted message to the second application router;
wherein the second application router is configured to:
receive the converted message;
further convert the received message into a format associated with the second application protocol; and
send the further-converted message to the target application;
wherein the discovered application and the target application initially cannot exchange data with one another, wherein the information characterizes at least one of data structures, interfaces, and protocols used by the application, wherein the first application router is further configured to forward state information to the second application router, wherein the state information prevents the first and second application routers from losing track of processing status of the data as the data moves between the first and second application routers, wherein data exchange between the discovered application and the target application is facilitated;
wherein the first application router is configured to register applications of the first application type in the repository of the first application router, and wherein the second application router is configured to register applications of a second application type in a repository of the second application router, wherein the second application type is different from the first application type.

12. An application router comprising:
a processor:
memory containing instructions which, when executed on the processor, perform an operation for discovering an application for integration on the network, wherein the application is of a first application type and communicates according to a first application protocol, wherein the operation comprises:
sending, on the first network, an invitation for applications of the first application type on the network to register with the application router;
receiving a registration notification responsive to the invitation, wherein the registration notification specifies information describing the application, wherein the information includes the first application protocol;
adding the information describing the application to a repository of the application router;
organizing the repository information into a data structure accessible through an interface; and
publishing the data structure onto at least a second application router on the network;
wherein the application router is configured to integrate the discovered application with a target application on the network, wherein the target application is configured to communicate according to a second application protocol different from the first application protocol.

13. The application router of claim 12 wherein the information added to the repository includes meta-data describing aspects of the application.

14. The application router of claim 12 further including instructions when executed cause at least one of the one or more application routers to operate as a standby application router in the event a different application router becomes temporarily or permanently unavailable.

15. The application router of claim 12 further including instructions when executed cause the application router to broadcast invitations over the application network inviting applications to submit a registration notification and join the application network.

16. A computer program product comprising: a computer-readable storage device having computer-readable program code embodied therewith, the computer-readable program code comprising: computer-readable program code configured to discover, by a first application router on a network, an application for integration on the network, wherein the application is of a first application type and communicates according to a first application protocol, wherein the computer-readable program code configured to discover the application for integration comprises: computer-readable program code configured to send, on the first network, an invitation for applications of the first application type on the network to register with the first application router; computer-readable program code configured to receive a registration notification responsive to the invitation, wherein the registration notification specifies information describing the application, wherein the information includes the first application protocol; computer-readable program code configured to add the information describing the application to a repository of the first application router; computer-readable program code configured to organize the repository information into a data structure accessible through an interface; and computer-readable program code configured to publish the data structure onto at least a second application router on the network; wherein the first application router is configured to integrate the discovered application with a target application on the network, wherein the target application is configured to communicate according to a second application protocol different from the first application protocol.

17. The computer program product of claim 16 wherein the information on the application includes structures, interfaces and protocols used by the application.

18. The computer program product of claim 16 wherein the information added to the repository includes meta-data describing aspects of the application.

19. The computer program product of claim 16 wherein the data structure is organized in a hierarchical arrangement with each application having a node with corresponding information.

20. The computer program product of claim 15 wherein publishing the data structure involves distributing the publication of information to one or more application routers.

* * * * *